United States Patent
Ioannou et al.

(10) Patent No.: US 12,423,589 B2
(45) Date of Patent: Sep. 23, 2025

(54) TRAINING DECISION TREE-BASED PREDICTIVE MODELS

(71) Applicant: INTERNATIONAL BUSINESS MACHINES CORPORATION, Armonk, NY (US)

(72) Inventors: Nikolas Ioannou, Zürich (CH); Thomas Parnell, Zürich (CH); Andreea Anghel, Adliswil (CH); Nikolaos Papandreou, Thalwil (CH); Charalampos Pozidis, Thalwil (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1059 days.

(21) Appl. No.: 17/111,611

(22) Filed: Dec. 4, 2020

(65) Prior Publication Data

US 2022/0180211 A1    Jun. 9, 2022

(51) Int. Cl.
*G06N 5/01* (2023.01)
*G06F 9/38* (2018.01)
*G06F 18/214* (2023.01)
*G06N 20/00* (2019.01)

(52) U.S. Cl.
CPC ............. *G06N 5/01* (2023.01); *G06F 9/3877* (2013.01); *G06F 18/2148* (2023.01)

(58) Field of Classification Search
CPC ........ G06N 5/01; G06N 20/00; G06F 9/3877; G06F 18/2148
See application file for complete search history.

(56) References Cited

U.S. PATENT DOCUMENTS

| 9,269,054 B1 | 2/2016 | Martin et al. |
| 2008/0201340 A1 | 8/2008 | Thonangi |
| 2015/0243285 A1 | 8/2015 | Lane et al. |

OTHER PUBLICATIONS

Authors: Wen et al Title: Exploiting GPUs for Efficient Gradient Boosting Decision Tree Training Publication Date: Dec. 2019 (Year: 2019).*
Author: David Svantesson Title: Implementing Streaming Parallel Decision Trees on Graphic Processing Units Publication Date: Jun. 18, 2018 (Year: 2018).*
Authors: Jayaraj et al. Title: Gpurfscreen: a GPU based virtual screening tool using random forest classifier Publication Date: Mar. 2016 (Year: 2016).*

(Continued)

*Primary Examiner* — Luis A Sitiriche
*Assistant Examiner* — Amy Tran
(74) *Attorney, Agent, or Firm* — Tutunjian & Bitetto, P.C.; Lily Neff

(57) ABSTRACT

According to one embodiment, a method, computer system, and computer program product for training a cognitive model that involves one or more decision trees as base learners is provided. The present invention may include constructing, by a tree building algorithm, the one or more decision trees, wherein the constructing further comprises associating one or more training examples with one or more leaf nodes of the one or more decision trees and iteratively running a breadth-first search tree builder on one or more of the decision trees to perform one or more tree building operations; and training the cognitive model based on the one or more decision trees.

20 Claims, 5 Drawing Sheets

(56) References Cited

OTHER PUBLICATIONS

Authors: Anghel et al. Title: Breadth-first, Depth-next Training of Random Forests Date: Sep. 15, 2019 (Year: 2019).*
Authors: Hou et al. Title: Memory-Scalable GPU Spatial Hierarchy Construction (Year: 2010).*
Anghel et al., "Breadth-first, Depth-next Training of Random Forests", arXiv:1910.06853v1, Oct. 15, 2019, 7 pages.
Gurung et al., "Learning Decision Trees from Histogram Data Using Multiple Subsets of Bins", Proceedings of the Twenty-Ninth International Florida Artificial Intelligence Research Society Conference, 2016, pp. 430-435.
IBM, "What's new in WML CE1.7.0", IBM Watson Machine Learning Community Edition information for the 1.7.0 release, printed on Nov. 19, 2020, 2 pages.
Xiao et al., "Distributed Decision Trees with Heterogeneous Parallelism", Github, printed Nov. 19, 2020, 20 pages, https://raypeng.github.io/DGBDT/.
Zhang et al., "GPU-acceleration for Large-scale Tree Boosting", arXiv:1706.08359v1, Jun. 26, 2017, 14 pages.

* cited by examiner

TRAINING DECISION TREE-BASED PREDICTIVE MODELS

BACKGROUND

The invention relates in general to computerized techniques of training a predictive model that involves one or more decision trees as base learners. In particular, it is directed to a method that maps selected tree building operations onto respective streams of a graphics processing unit.

Decision tree learning is a predictive modelling approach used in machine learning (ML). It involves one or more decision trees, which form the predictive model. Decision trees are widely used, owing to their simplicity and interpretability. Different types of decision trees are known, including classification trees and regression trees. A binary decision tree is basically a structure involving coupled decision processes. Starting from the root, a feature is evaluated, and one of the two branches of the root node is selected. This procedure is repeated until a leaf node is reached, a value of which is used to assemble a final result.

SUMMARY

According to one embodiment, a method, computer system, and computer program product for training a cognitive model that involves one or more decision trees as base learners is provided. The present invention may include constructing, by a tree building algorithm, the one or more decision trees, wherein the constructing further comprises associating one or more training examples with one or more leaf nodes of the one or more decision trees and iteratively running a breadth-first search tree builder on one or more of the decision trees to perform one or more tree building operations, wherein on at least one level of said one or more decision trees, tree building operations that pertain to at least two pairs of sibling nodes are mapped onto multiple streams hosted on a graphics processing unit, and wherein the sibling nodes are nodes that have been split from a same parent node; and training the cognitive model based on the one or more decision trees.

BRIEF DESCRIPTION OF THE SEVERAL VIEWS OF THE DRAWINGS

These The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of the concepts, flowchart, and system as involved in embodiments. Similar or functionally similar elements in the figures have been allocated the same numeral references, unless otherwise indicated.

DETAILED DESCRIPTION

Figure 1A:
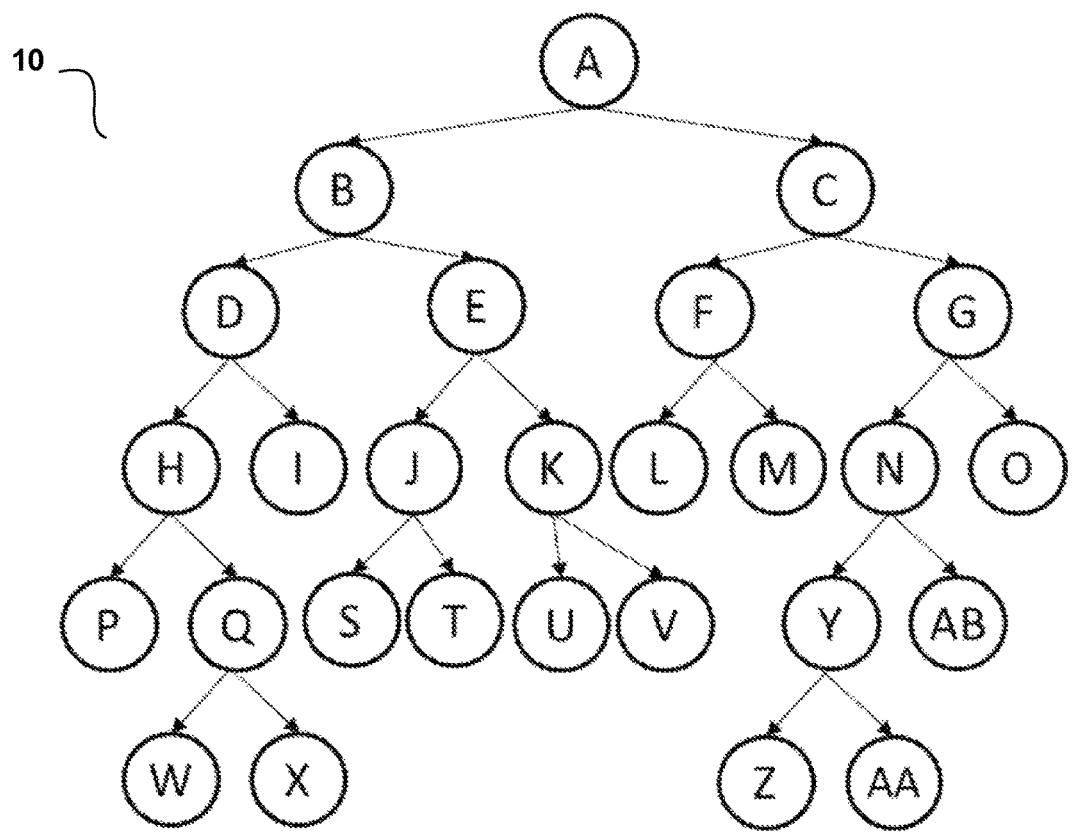
FIG. 1A schematically represents a (simple) example of a binary decision tree, as may eventually be obtained by running a tree building algorithm according to embodiments.

As described above, decision tree learning is a predictive modelling approach used in machine learning (ML). It involves one or more decision trees, which form the predictive model. Decision trees are widely used, owing to their simplicity and interpretability. Different types of decision trees are known, including classification trees and regression trees. A binary decision tree is basically a structure involving coupled decision processes. Starting from the root, a feature is evaluated, and one of the two branches of the root node is selected. This procedure is repeated until a leaf node is reached, a value of which is used to assemble a final result.

Random forest and gradient boosting are important ML methods, which are based on binary decision trees. Such methods are used in multiple applications, including bioinformatics, climate change modelling, and credit card fraud detection. In such methods, multiple decision trees are "walked" in parallel until leaf nodes are reached. The results taken from the leaf nodes are then averaged (regression) or used in a majority vote (classification). Other types of ensemble models may rely on decision trees as base learners. Ensemble models are sometimes amenable to high degree of parallelism. Notwithstanding their conceptual simplicity, computations performed to train tree-based model can be time (and resources) consuming. In particular, designing a scalable and fast decision-tree building algorithm is key for improving performance of random forest models and, more generally, cognitive models that use decision trees as base learners, notably in terms of training time.

The performance in training time obtained depends on the manner in which the tree is built, starting with the order in which the nodes are created/traversed. One well-known approach is the so-called depth-first search (DFS) algorithm. A DFS-based, tree building algorithm starts at a root node and explores as deeply as possible along each path before backtracking and exploring other paths. If, for example, the left children nodes are chosen before the right children nodes, the algorithm starts at the root node and recursively selects the left child first at each depth level. Once a terminal (or leaf) node has been reached, it traverses up recursively until an unexplored right-hand-side child is encountered. A DFS-based, tree building algorithm is notably available in the widely used machine learning framework, sklearn.

An alternative approach is to construct the tree level-by-level using another well-known algorithm, called breadth-first search (BFS). BFS is implemented by various software packages such as xgboost.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

According to a first aspect, the present invention is embodied as a computer-implemented method of training a cognitive model that involves one or more decision trees as base learners. The method trains the cognitive model based on training examples of a training dataset by running a tree building algorithm to construct the one or more decision trees and thereby associate the training examples to leaf nodes of the one or more decision trees accordingly constructed. Running the tree building algorithm comprises, for each tree of the one or more decision trees being built, iteratively running a breadth-first search (BFS) tree builder to perform tree building operations, e.g., determining a best node split and performing a node split corresponding to the best split determined. The BFS tree builder is run on a graphics processing unit (GPU), which is designed so as to enable stream processing. At one level, at least, of said each tree, tree building operations that pertain to at least two pairs of sibling nodes are mapped onto respective ones of multiple streams enabled by the stream processing. The sibling nodes of each of said at least two pairs are nodes that have been split from a same parent node as per iteratively running the BFS tree builder.

The tree building algorithm preferably relies on histogram-based, compressed representations of the training dataset. In that case, the histogram representations need be repeatedly updated while performing the tree building operations for said each tree. In the present context, such representations can advantageously be updated by running a routine on the GPU.

In preferred embodiments, a hybrid tree building algorithm is relied upon. That is, the tree building algorithm involves two tree builders, including a depth-first search (DFS) tree builder, in addition to the BFS tree builder. The DFS tree builder is meant to be run concurrently with the BFS tree builder, by processing means of a central processing unit (CPU), to which a given cache memory is connected. Running the hybrid tree building algorithm comprises, for said each tree, starting with the BFS tree builder, to perform tree building operations, and then dynamically assigning tree building operations to the DFS tree builder for execution by the processing means of the CPU. At any level of said each tree, given tree building operations that pertain to a given pair of sibling nodes (that have been split from a same parent node as per iteratively running the BFS tree builder) are assigned to the DFS tree builder for execution on the CPU if it is determined that a memory size of the cache memory connected to the CPU is more conducive to executing the DFS tree builder by the processing means of the CPU than executing the BFS tree builder on the GPU to perform said given operations.

Such operations may advantageously be executed by the processing means of the CPU concurrently with tree building operations that are mapped onto respective ones of multiple streams enabled by the stream processing of the GPU, as per iteratively running the BFS tree builder.

The system may, responsive to assigning given tree building operations to the DFS tree builder, push all the tree building operations pertaining to the given pair of sibling nodes and subsequent child nodes, if any, of the given pair of sibling nodes to the DFS tree builder.

According to another aspect, the invention is embodied as a computerized system for training a cognitive model that involves one or more decision trees as base learners. The system comprises: processing means, including a GPU enabling stream processing, a memory, connected to the processing means, and storage means. The latter stores computerized methods that include a tree building algorithm with a BFS tree builder. In operation, the system is configured to load the computerized methods, at least partly, in the memory, so as to train the cognitive model based on training examples of a training dataset by running the tree building algorithm to construct the one or more decision trees and thereby associate the training examples to leaf nodes of the one or more decision trees accordingly constructed. Consistently with the first aspect of the invention, the tree building algorithm is designed so as to cause, for each tree of the one or more decision trees being built, to iteratively run the BFS tree builder on the GPU to perform tree building operations, whereby, at one level, at least, of said each tree, those of the tree building operations that pertain to at least two pairs of sibling nodes (i.e., nodes that have been split from a same parent node, for each pair of sibling nodes) are mapped onto respective ones of multiple streams enabled by the stream processing.

The computerized system is preferably configured to concurrently run a DFS tree builder and the BFS tree builder, in parallel.

According to a final aspect, the invention is embodied as a computer program product for training a cognitive model that involves one or more decision trees as base learners, using processing means that includes a GPU enabling stream processing, as described above. The computer program product comprises a computer readable storage medium having program instructions embodied therewith, wherein the program instructions are executable by the processing means to cause the latter to take steps according to the present methods.

Computerized systems, methods, and computer program products embodying the present invention will now be described, by way of non-limiting examples, and in reference to the accompanying drawings. The present method and its variants are collectively referred to as the "present methods". All references Sn refer to methods steps of the flowchart of FIG. 5, while numeral references pertain to physical parts or components of the computerized unit 101 of FIG. 6.

Figure 1B:
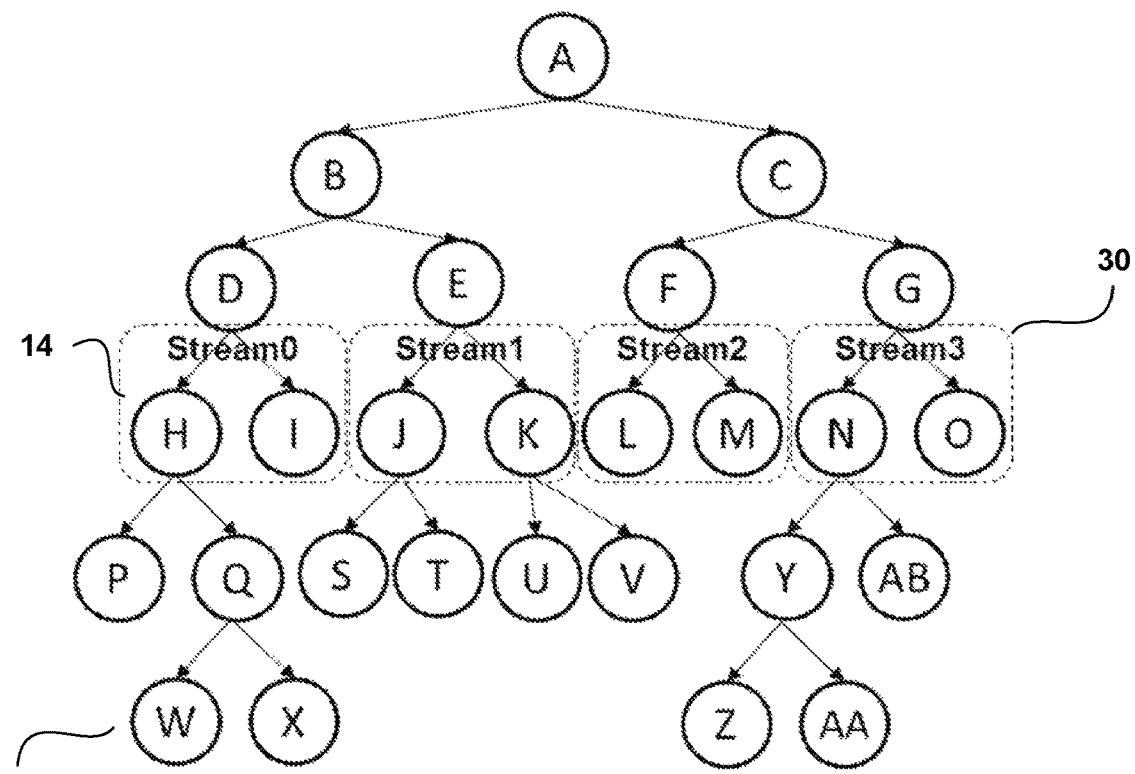
FIG. 1B illustrates how, at a given level of the tree of FIG. 1A, tree building operations that pertain to pairs of sibling nodes can be mapped onto respective GPU streams, as in embodiments.
Figure 5:
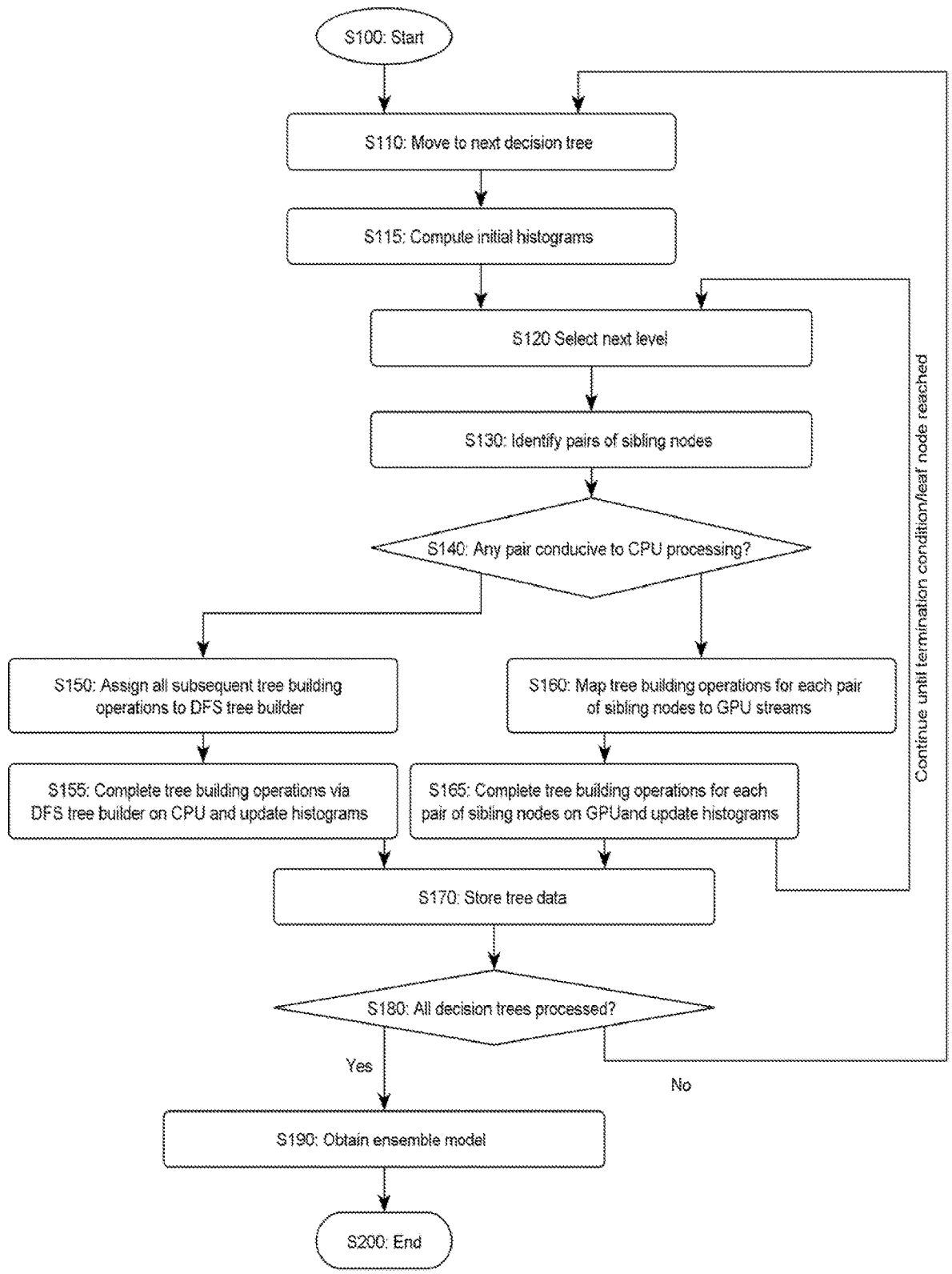
FIG. 5 is a flowchart illustrating high-level steps of a histogram-based method of training a cognitive model that involves decision trees as base learners, according to embodiments.

In reference to FIGS. 1A, 1B, and 5, an aspect of the invention is first described, which concerns a computer-implemented method of training a cognitive model. This model involves one or more binary decision tree as base learners. The model may notably be an ensemble model, e.g., a random forest or a gradient boosting model.

The method aims at training the cognitive model based on training examples of a training dataset. As a general principle, the training causes to run a tree building algorithm to effectively construct S100-S200 the decision trees 10 and thereby associate training examples to leaf nodes of the decision trees 10 accordingly constructed.

In the present case, the tree building algorithm involves a BFS tree builder, which is iteratively run S120-S165 for each tree S110. I.e., each binary decision tree is independently built, starting at a respective root node. The following mostly describes operations performed for a single tree, it being understood that similar operations can be performed for each tree involved, as assumed in FIG. 5.

The BFS tree builder performs various tree building operations at step S165. Such operations may notably include determining best node splits and performing the corresponding node splits. Such operations are known per se. In the present case, however, such operations are executed on a GPU, which is designed to enable stream processing. Stream processing is a computer programming paradigm, which allows certain applications to more easily exploit a form of parallel processing. In the present context, stream parallelization is exploited to improve the efficiency of the tree building.

The GPU is preferably enabled to use or be otherwise compatible with compute unified device architecture (CUDA). CUDA streams are sequences of operations that execute on the GPU in the order in which they are issued by the host code (here the BFS tree builder). CUDA operations in different streams can be interleaved and, when possible, run concurrently, while operations within a given stream execute in a prescribed order.

According to the present methods, certain tree building operations are mapped S160 onto respective ones of the multiple streams 30 enabled by the GPU. Such operations pertain to a same depth level of the tree. Note, a "depth level" of a tree is sometimes referred to as a mere "level" in this document, as customary in the art. The same process is repeated for each tree depth level, whenever possible. That is, the mapping is performed iteratively, i.e., one tree level after the other, as illustrated in FIG. 1B for a particular level 14 of the tree. As a result, at a given level 14 of the tree, tree building operations that pertain to pairs of sibling nodes are mapped S160 onto respective GPU streams 30 for concurrent execution by the GPU. In practice, any number n≥2 of pairs of sibling nodes may give rise to a same number n of tree building operations, mapped onto respective GPU streams and, this, at each of one or more levels of the tree.

Note, each pair involves nodes that have been split S165 from a same parent node, due to the execution of the BFS tree builder. Thus, the mapping scheme does not apply to the root node, by construction. However, sibling nodes may, at any of the subsequent tree levels, potentially be processed by mapping corresponding operations to respective GPU streams 30.

In the example of FIG. 1B, operations pertaining to four pairs of nodes {H, I}, {J, K}, {L, M}, and {N, O}, are assumed to be mapped to distinct GPU streams (Stream0 to Stream 3), upon building a given level 14 of nodes of the tree. E.g., multiple threads may be involved, each operating on its own CUDA stream. A similar mapping scheme may possibly be involved at any or each level of the tree, while progressively building the tree. The present description assumes that at least one tree level 14 (but the very first level corresponding to the root node) will potentially give rise to such a mapping, with benefits in terms of execution speed. The mapping scheme may be continued as long as the BFS tree builder is run, e.g., until a termination condition is met or the algorithm pushes computations related to a given pair of sibling nodes to a CPU-based tree builder, as in embodiments discussed later.

Figure 4A:
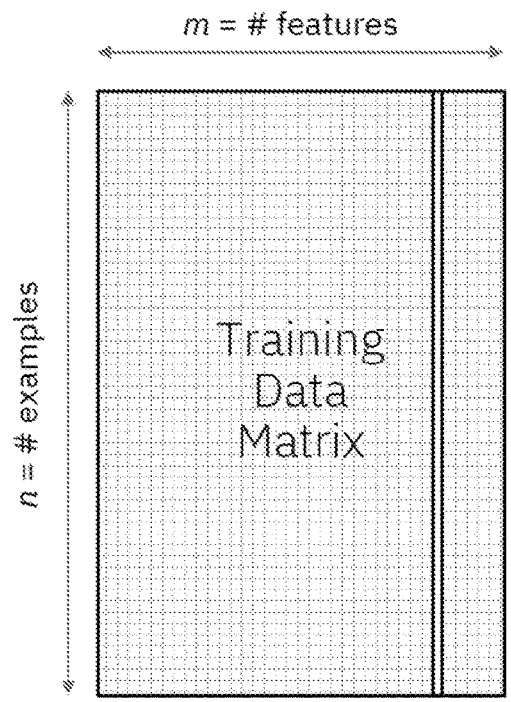
FIGS. 4A-4C illustrate how the tree building algorithm can make use of histogram-based, compressed representations of features of the training dataset, as in embodiments.
Figure 4B:
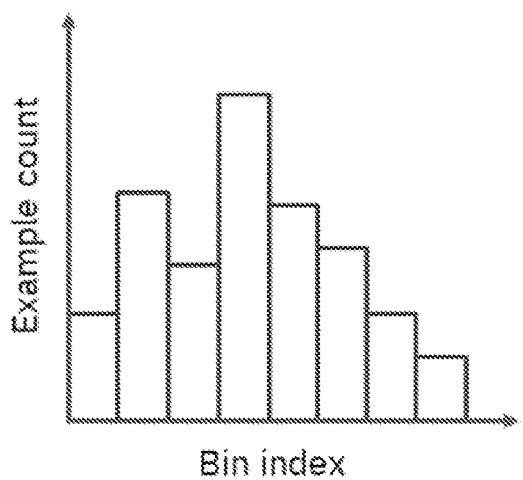
Figure 4C:
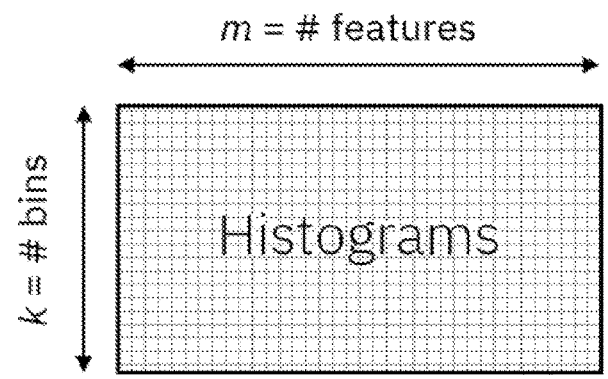

Referring to FIGS. 4A-5C, the tree building algorithm preferably relies on histogram-based, compressed representations of the training dataset. Such compressed representations are known per se. According to such compressed representations, the whole dataset (including features of the training examples) is represented using a compressed format. Histograms compactly describe the distribution of the data. I.e., one may construct a histogram for each feature of the training dataset to compactly describe the distribution of the examples. That is, for every feature, one may build a histogram with k bins, see FIG. 4B, instead of relying on a matrix-based representation (FIG. 4A). Histogram aggregation can advantageously be used to speed up the split finding process. I.e., instead of considering every possible way to split a set of training instances based on a given feature (e.g., based on a training matrix, FIG. 4A), one may simply consider discrete partitions of the feature space. In "exact" tree building, the complexity of searching for the best split at each node amounts to $O(n \times m)$, where n is the number of training examples and m the number of features, while the complexity of searching for the best split in a histogram-based representation amounts to $O(k \times m)$, where k is the number of bins per feature and is typically much smaller than n, in practice. Relying on histograms avoids repeated sorting of data to become a bottleneck, as known per se. However, during the tree building, histograms statistics need be continually re-computed as the number of active examples in each node is reduced.

In the present case, the compressed representations are repeatedly updated S165 while performing tree building operations for each tree. That is, update operations S165 can be suitably interleaved with split operations. E.g., after having split a node, histograms corresponding to each sibling node need be updated S165, to enable subsequent node splits, and so on. This is preferably done using GPU resources, i.e., using a routine running on the GPU, aside from other tree building operations. Note, histograms that are updated at the GPU concern pairs of nodes that have not been handed over to the CPU DFS-solver yet.

Note, initial histograms (one for each feature of the training dataset) are typically pre-computed S115 at an early stage (prior to start iteratively running the BFS tree builder). Then, weights of the initial histograms are repeatedly updated S165 as the number of remaining active examples decreases as each tree is being built. This number corresponds to training examples that are active at each node and are not yet associated with a terminal node of the decision tree being built.

Figure 2:
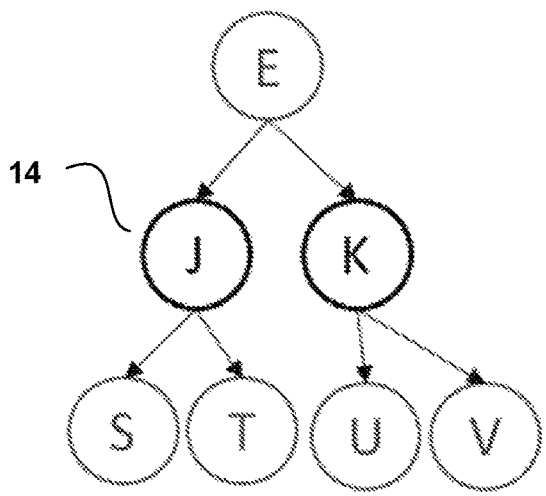
FIG. 2 shows a portion of the tree of FIG. 1A, together with numbers of active examples as remaining at the time of creating selected nodes of this portion. This figure serves to illustrate how histogram representations of the training subset associated with such nodes can be updated in view of performing subsequent tree building operations, in embodiments.

Referring to FIG. 2, updating the histograms may amount to compute S165 two sets of histograms, i.e., one set for each sibling node of each pair and, this, at each level (at each iteration). For each pair of sibling node (the pair {J, K} in FIG. 2), a first set of histograms will be needed to enable operations pursuant to the creation of a first node K, and a second set of histograms will similarly be needed for a second node J. Each histogram relates to a feature that may need be processed as part of processing child nodes of a current node (i.e., one of the two sibling nodes J, K), owing to the iterative algorithm. That is, each histogram of the first set and the second set is a histogram of one of the features that need be associated with the first node and the second node, respectively.

The first node K is associated with a first number of examples, which can be assumed to be less than (or equal to) a second number of examples, to which the second node J is associated. For example, in FIG. 2, the node J is assumed to be associated with 9 000 remaining active examples, while the node K may have 1 000 examples only; the parent node E was associated to 10 000 remaining examples when it was created. In that case, each histogram of the first set (corresponding to node K) may be entirely computed S165, while histograms of the second set (corresponding to node J) may simply be computed S165 by subtraction, i.e., by subtracting bin values of the corresponding histogram of the first set from the bin values of the corresponding histogram of the parent node E, see FIG. 2. Note, each "corresponding histogram" is a histogram of the same feature.

Figure 3:
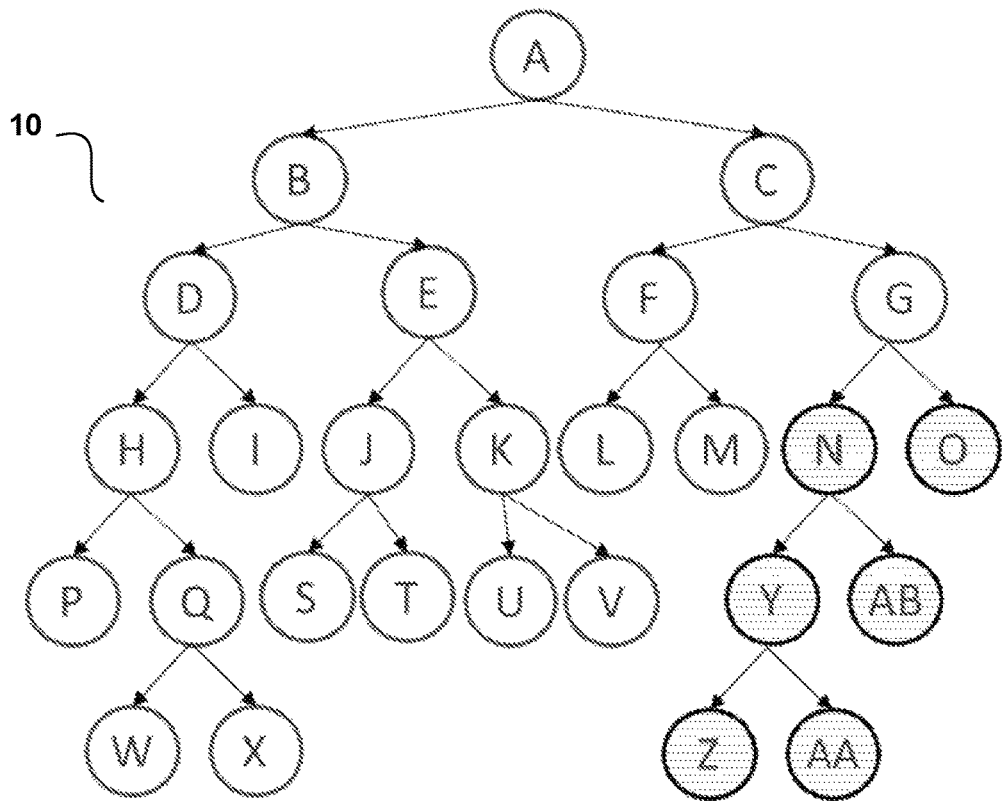
FIG. 3 illustrates operations of a hybrid algorithm, in which tree building operations pertaining to selected nodes are executed on a CPU, whereas operations pertaining to the remaining nodes are executed on a GPU, as in embodiments.

Preferred embodiments rely on a hybrid GPU-CPU algorithm, as now discussed in reference to FIGS. 3 and 5. That is, the tree building algorithm may involve two tree builders, including the BFS tree builder described above and, in addition, a DFS tree builder. Contrary to the BFS builder, the DFS tree builder is designed to be run by processing means of a CPU, to which a given cache memory is connected. Moreover, the tree building algorithm may be designed to allow the DFS tree builder to be executed concurrently with the BFS tree builder.

For example, the tree building algorithm may, for each tree processed, start building the tree using the BFS tree builder, as described earlier. This way, tree building operations are first performed in a BFS fashion. For example, after splitting the root node A, the BFS builder operates across child nodes B and C, and then across all subsequent pairs {D, E}, {F, G} of child nodes, and so on. At each step, the BFS builder operates across each pair of sibling nodes at a same depth, as illustrated in FIG. 1B.

However, at any level of the tree (but the root level), given tree building operations may possibly be assigned S140-S150 to the DFS tree builder for execution S155 on the CPU. Such operations pertain to a given pair of sibling nodes (nodes N,O in the example of FIG. 3) and subsequent child nodes, i.e., nodes that have previously been split from the parent node G, owing to previous iterations of the BFS tree builder.

The decision to push such operations to the DFS builder can be made based on simple heuristics. That is, such operations are assigned to the DFS builder if it is determined S140 that executing them on a CPU would be more efficient than on a GPU like, for example, when the memory size of the CPU cache memory (typically the first cache level) is more conducive to executing the DFS tree builder on the CPU than executing the BFS tree builder on the GPU, for the corresponding operations. That is, the question to answer is whether the required data fits into the CPU cache. As the skilled person may realize, it may indeed be more advantageous to execute tree building operations on a CPU unit for "small" pairs of sibling nodes than on a GPU. A "small" pair means a pair involving a small number of remaining active training examples, and hence requires a smaller number of operations than a "large" pair. Once a decision is made to proceed further with the CPU for a given pair of nodes (nodes N, 0 in FIG. 3), the residual tree building operations (also for all subsequent child nodes) will be performed using a DFS approach, on the CPU. When there are only few active training examples left, one can expect the DFS to have better efficiency than BFS.

Note, the hybrid algorithm does not bluntly switch from BFS to DFS operations, given that the two tree builders involved can be operated in parallel. In practice, the two tree building algorithms are operated in parallel, i.e., at the same time, to perform distinct operations. That is, for each pair of sibling nodes, a decision is made as to whether to run their computations on the GPU or the CPU. Thus, at some point in time, some pairs of (large) sibling nodes may be computed on the GPU, whereas other pairs of (small) sibling nodes may happen to be computed on the CPU. Thus, tree building operations assigned to the DFS tree builder can be executed S155 (on the CPU) concurrently with tree building operations S165 as currently mapped onto respective GPU streams 30, as per iteratively running the BFS tree builder.

In practice, assigning S140-S150 tree building operations to the DFS tree builder causes to push S150 all operations pertaining to a given pair (e.g., the pair {N, O} in FIG. 3) of sibling nodes, as well as to the subsequent child nodes (e.g., Y, Z, AA, and AB in FIG. 3), as these are built by the DFS tree builder. This makes sense because the decreasing complexity of the corresponding operations is more suitable for CPU execution.

The flowchart FIG. 5 depicts high-level steps of a preferred embodiment, which assumes an ensemble model (e.g., Gradient Boosting, Random Forest, etc.) that requires building S180 several binary decision trees. The algorithm starts at S100. In this example, for each decision tree being built S110, the tree building algorithm computes initial histograms S115 and starts with the BFS builder. The builder proceeds S120 from the root node and then iteratively S120, one level at a time, as explained earlier. At each level, pairs of sibling nodes obtained by splitting S165 parent nodes are identified S130. Tree building operations (node splitting, histogram updates) that are estimated S140 to be best suited for GPU processing are mapped S160 onto respective GPU streams for execution S165 on the GPU. However, where a pair of small sibling nodes is found S140 to be more conducive to CPU execution, all corresponding and subsequent tree building operations are assigned S150 to the DFS tree builder for execution S155 on CPU. Tree building operations are continued until a termination condition is met or leaf nodes are reached. Eventually, all necessary tree data are stored S170 and the tree building algorithm proceeds S180 to another tree, if necessary. Of course, several trees may possibly be built in parallel, the context permitting. Once all trees have been built, an ensemble model is obtained S190 and the algorithm ends S200. The ensemble models is then ready for inferences or classifications.

Various tests have ben performed by the present inventors. Such tests have shown that, the hybrid GPU-CPU training algorithm of histogram tree ensemble models presented in the current disclosure, speed-up factors of 1.5 to 2.6 may be achieved compared to existing GPU-based solutions. Compared to CPU-only training methods, speed-up factors of 5 to 59 were observed.

Figure 6:
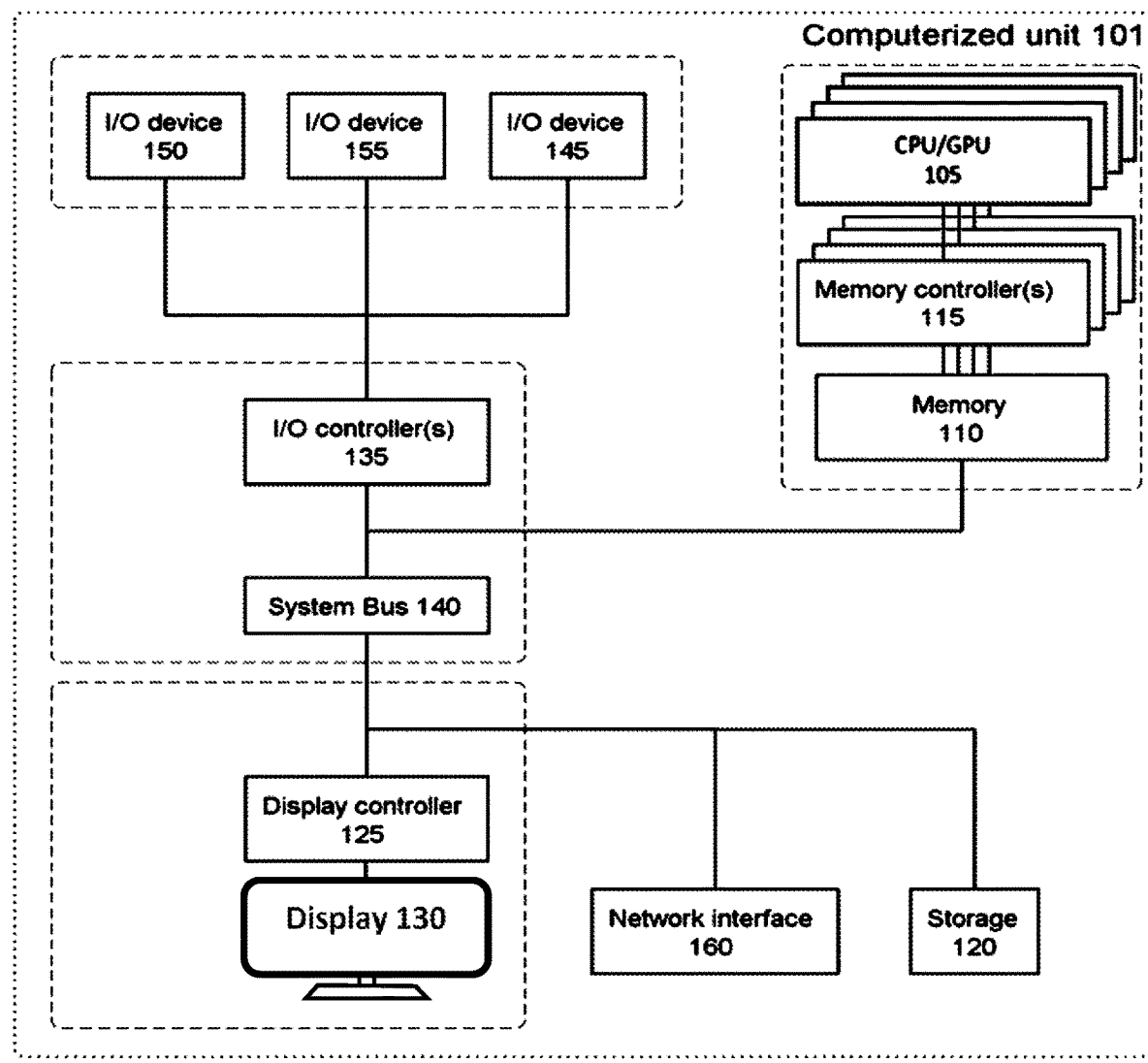
FIG. 6 schematically represents a general-purpose computerized system, suited for implementing one or more method steps as involved in embodiments of the invention.

Referring to FIG. 6, another aspect of the invention is now described, which concerns a computerized unit 101 for training a cognitive model. Again, this model may involve one or more decision trees as base learners.

The system may for instance be a single computerized unit 101, as assumed in FIG. 6. It basically comprises processing means 105, including a GPU, which enables stream processing. This computerized unit 101 may for instance be a CUDA-enabled GPU. The computerized unit 101 further includes a memory 110, connected to the processing means, and storage means 120. The latter notably stores computerized methods that include a tree building algorithm as described earlier in reference to methods according to embodiments. I.e., the tree building algorithm notably involves a BFS tree builder.

In operation, the computerized unit 101 is configured to load the computerized methods, at least partly, in the memory 110, to train the cognitive model based on training examples of a training dataset. Once loaded, such computerized methods cause, upon execution, to run the tree building algorithm to accordingly constructs the binary decision tree(s). The tree building algorithm notably causes, for each tree being built, to iteratively run the BFS tree builder on the GPU, whereby tree building operations that pertain to pairs of sibling nodes are mapped onto respective GPU streams 30, as explained earlier in reference to the first aspect of the invention.

In embodiments, the memory 110 includes a cache memory and the processing means 105 further includes one or more CPU units, to which the cache memory is connected. The system may thus run a hybrid algorithm. That is, the tree building algorithm may involve two tree builders, including a DFS tree builder, in addition to the BFS tree builder described above. The DFS tree builder is meant to be executed by the CPU. The tree building algorithm is devised to concurrently run the DFS tree builder and the BFS tree builder in parallel, so as for the DFS tree builder to perform tree building operations pertaining to pairs of sibling nodes that differ from pairs of sibling nodes for which the tree building operations are performed by the BFS tree builder, as explained earlier.

A final aspect of the invention concerns a computer program product for training a cognitive model. This program may for instance be run (at least partly) on a computerized unit 101 such as depicted in FIG. 6. This program product comprises a computer readable storage medium having program instructions embodied therewith, which program instructions are executable by one or more processing units (e.g., such as GPU and CPU 105), to cause the latter to take steps according to the present methods, i.e., train the cognitive model based on training examples by running a tree building algorithm, as explained earlier.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, the system depicted in FIG. 6 schematically represents a computerized unit 101, e.g., a general- or specific-purpose computer.

In exemplary embodiments, in terms of hardware architecture, as shown in FIG. 6, the computerized unit 101 includes at least one processor 105, a cache memory 112, and a memory 110 coupled to a memory controller 115. Preferably though, several processors (CPUs and GPUs) are involved, as discussed earlier. To that aim, the processing units may be assigned respective memory controllers, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor(s) 105 is (are) a hardware device for executing software, particularly that initially stored in memory 110. The processor(s) 105 can be any custom made or commercially available processor(s). The processor(s) include(s) one or more graphics processing units (GPUs), and, preferably, further include one or more central processing units (CPUs). In general, such processors may involve any type of semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor(s) 105.

The software in memory 110 may include one or more separate programs, each of which comprises an ordered listing of executable instructions for implementing logical functions. In the example of FIG. 6, the software in the memory 110 includes computerized methods, forming part of all of the methods described herein in accordance with exemplary embodiments and, in particular, a suitable operating system (OS). The OS essentially controls the execution of other computer programs and provides scheduling, input-output control, file and data management, memory management, and communication control and related services.

The methods described herein (or part thereof) may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object-oriented programming language, which has classes of data and methods, or a procedure programming language, which has routines, subroutines, and/or functions.

Possibly, a conventional keyboard and mouse can be coupled to the input/output controller 135. Other I/O devices 145-155 may be included. The computerized unit 101 can further include a display controller 125 coupled to a display 130. In exemplary embodiments, the computerized unit 101 can further include a network interface or transceiver 160 for coupling to a network, to enable, in turn, data communication to/from other, external components.

The network transmits and receives data between the computerized unit 101 and external devices. The network is possibly implemented in a wireless fashion, e.g., using wireless protocols and technologies, such as Wifi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the computerized unit 101 and any external server, client and the like via a broadband connection. In exemplary embodiments, network can be a managed IP network administered by a service provider. Besides, the network can be a packet-switched network such as a LAN, WAN, Internet network, an Internet of things network, etc.

If the computerized unit 101 is a PC, workstation, intelligent device or the like, the software in the memory 110 may further include a basic input output system (BIOS). The BIOS is stored in ROM so that the BIOS can be executed when the computerized unit 101 is activated. When the computerized unit 101 is in operation, the processor(s) 105 is(are) configured to execute software stored within the memory 110, to communicate data to and from the memory 110, and to generally control operations of the computerized unit 101 pursuant to the software.

The methods described herein and the OS, in whole or in part are read by the processor(s) 105, typically buffered within the processor(s) 105, and then executed. When the methods described herein are implemented in software, the methods can be stored on any computer readable medium, such as storage 120, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of training a cognitive model that involves one or more decision trees as base learners, wherein the method comprises:
    constructing, by a hybrid tree building algorithm, the one or more decision trees, wherein the constructing further comprises:
        associating one or more training examples with one or more leaf nodes of the one or more decision trees;
        iteratively running a breadth-first search (BFS) tree builder on one or more of the decision trees to perform one or more tree building operations, wherein on at least one level of said one or more decision trees, tree building operations that pertain to at least two pairs of sibling nodes are mapped onto multiple streams hosted on a graphics processing unit (GPU), and wherein the sibling nodes are nodes that have been split from a same parent node; and
        responsive to a determination concurrent with the tree building operations that a memory size of a cache memory connected to a central processing unit (CPU) is more optimal than the GPU for executing the one or more tree building operations, dynamically assigning at least one of the one or more tree building operations for small nodes, pairs of sibling nodes associated with active training examples, to a depth-first search (DFS) tree builder for execution by the CPU concurrently with tree building operations related to nodes associated with a larger number of active training examples than small nodes mapped onto respective GPU streams running the BFS tree builder; and
    training the cognitive model based on the one or more decision trees.

2. The method according to claim 1, wherein said tree building operations comprise, for one or more nodes of the at least two pairs of sibling nodes, determining a best split and performing a node split corresponding with the best split determined.

3. The method according to claim 2, wherein the tree building algorithm relies on histogram-based, compressed representations of a training dataset, and said representations are repeatedly updated while performing said tree building operations for said one or more decision trees.

4. The method according to claim 3, wherein said representations are repeatedly updated by running a routine on the graphics processing unit.

5. The method according to claim 4, the method further comprising:
    prior to iteratively running said breadth-first search tree builder, pre-computing a histogram of features of the training dataset, so as to obtain a plurality of initial histograms.

6. The method according to claim 3, wherein:
    said tree building operations further comprise, for said pairs of sibling nodes, computing two sets of histograms, including a first set of histograms for a first node of the at least two pairs of sibling nodes and a second set of histograms for a second node of the at least two pairs of sibling nodes,
    one or more histograms of the first set is a histogram of one feature of the dataset that is associated with the first node, and
    one or more histograms of the second set is a histogram of one feature of the dataset that is associated with the second node.

7. The method according to claim 6, wherein:
    the first node and the second node are associated with a first number of examples and a second number of examples of the training dataset, respectively, wherein the first number is less than or equal to the second number;
    one or more histograms of the first set is entirely computed; and
    one or more histogram of the second set is computed by subtracting bin values of a corresponding histogram of the first set to bin values of a corresponding histogram of said same parent node.

8. The method according to claim 1, wherein:
    the tree building algorithm involves two tree builders, including said breadth-first search tree builder and a depth-first search tree builder, wherein the depth-first search tree builder is run concurrently with said breadth-first search tree builder, and wherein running the tree building algorithm comprises, for the one or more decision trees:
        performing the one or more tree building operations starting with the breadth-first search tree builder; and
        responsive to determining that a memory size is more conducive to executing the depth-first search tree builder than executing the breadth-first search tree builder, executing tree building operations that pertain to a given pair of the sibling nodes at one or more levels of at least one of the one or more decision trees by the depth-first search tree builder.

9. The method according to claim 8, the method further comprising:
    executing the tree building operations concurrently with tree building operations that are mapped onto the multiple streams by the breadth-first search tree builder.

10. The method according to claim 8, further comprising:
responsive to executing at least one of the tree building operations by the depth-first search tree builder, pushing all the tree building operations pertaining to a corresponding pair of the at least two pairs of sibling nodes, and any subsequent child nodes, to the depth-first search tree builder.

11. The method according to claim 1, wherein said cognitive model is selected from a list consisting of:
a random forest model, a tree-based gradient boosting model, and a decision tree model.

12. The method according to claim 1, wherein the graphics processing unit uses compute unified device architecture.

13. A computerized system for training a cognitive model that involves one or more decision trees as base learners, the system comprising:
processing means, including a graphics processing unit enabling stream processing; a memory, connected to the processing means; and
storage means storing computerized methods that include a tree building algorithm with a breadth-first search tree builder, wherein the system is configured to load the computerized methods, at least partly, in the memory, so as to perform a method comprising:
constructing, by a hybrid tree building algorithm, the one or more decision trees, wherein the constructing further comprises:
associating one or more training examples with one or more leaf nodes of the one or more decision trees;
iteratively running a breadth-first search (BFS) tree builder on one or more of the decision trees to perform one or more tree building operations, wherein on at least one level of said one or more decision trees, tree building operations that pertain to at least two pairs of sibling nodes are mapped onto multiple streams hosted on a graphics processing unit (GPU), and wherein the sibling nodes are nodes that have been split from a same parent node; and
responsive to a determination concurrent with the tree building operations that a memory size of a cache memory connected to a central processing unit (CPU) is more optimal than the GPU for executing the one or more tree building operations, dynamically assigning at least one of the one or more tree building operations for small nodes, pairs of sibling nodes associated with active training examples, to a depth-first search (DFS) tree builder for execution by the CPU concurrently with tree building operations related to nodes associated with a larger number of active training examples than small nodes mapped onto respective GPU streams running the BFS tree builder; and
training the cognitive model based on the one or more decision trees.

14. The computerized system according to claim 13, wherein:
said memory includes a cache memory;
the processing means further includes a central processing unit to which the cache memory is connected;
the tree building algorithm involves two tree builders, including the breadth-first search tree builder and a depth-first search tree builder, wherein the depth-first search tree builder is executed by the central processing unit; and
the tree building algorithm concurrently runs the depth-first search tree builder and the breadth-first search tree builder in parallel.

15. The computerized system according to claim 13, wherein the graphics processing unit uses compute unified device architecture.

16. A computer program product for training a cognitive model that involves one or more decision trees as base learners, using processing means that includes a graphics processing unit enabling stream processing, the computer program product comprising a computer readable storage medium having program instructions embodied therewith, the program instructions executable by said processing means to execute a method comprising:
constructing, by a hybrid tree building algorithm, the one or more decision trees, wherein the constructing further comprises:
associating one or more training examples with one or more leaf nodes of the one or more decision trees;
iteratively running a breadth-first search (BFS) tree builder on one or more of the decision trees to perform one or more tree building operations, wherein on at least one level of said one or more decision trees, tree building operations that pertain to at least two pairs of sibling nodes are mapped onto multiple streams hosted on a graphics processing unit (GPU), and wherein the sibling nodes are nodes that have been split from a same parent node; and
responsive to a determination concurrent with the tree building operations that a memory size of a cache memory connected to a central processing unit (CPU) is more optimal than the GPU for executing the one or more tree building operations, dynamically assigning at least one of the one or more tree building operations for small nodes, pairs of sibling nodes associated with active training examples, to a depth-first search (DFS) tree builder for execution by the CPU concurrently with tree building operations related to nodes associated with a larger number of active training examples than small nodes mapped onto respective GPU streams running the BFS tree builder; and
training the cognitive model based on the one or more decision trees.

17. The computer program product according to claim 16, wherein
said program instructions are executable by said processing means to determine a best split and perform a node split corresponding to the best split determined as part of said tree building operations.

18. The computer program product according to claim 17, wherein
the tree building algorithm relies on histogram-based, compressed representations of a training dataset, and
said program instructions are executable by said processing means to repeatedly update the representations concurrently with iteratively running the breadth-first search tree builder for said one or more trees.

19. The computer program product according to claim 18, wherein said program instructions are executable by said processing means to repeatedly update said representations by running a routine on the graphics processing unit.

20. The computer program product according to claim 16, wherein:
the computer program product is designed for training the cognitive model using processing means that further includes a central processing unit to which a given cache memory is connected, the tree building algorithm involves two tree builders, including said breadth-first search tree builder and a depth-first search tree builder, wherein the depth-first search tree builder is run concurrently with said breadth-first search tree builder, and wherein running the tree building algorithm comprises, for the one or more decision trees:

performing the one or more tree building operations starting with the breadth-first search tree builder; and responsive to determining that a memory size is more conducive to executing the depth-first search tree builder than executing the breadth-first search tree builder, executing tree building operations that pertain to a given pair of the sibling nodes at one or more levels of at least one of the one or more decision trees by the depth-first search tree builder.

\* \* \* \* \*